April 8, 1924.
S. C. WOLFE
WINDSHIELD CLEARER
Filed May 2, 1922
1,489,294
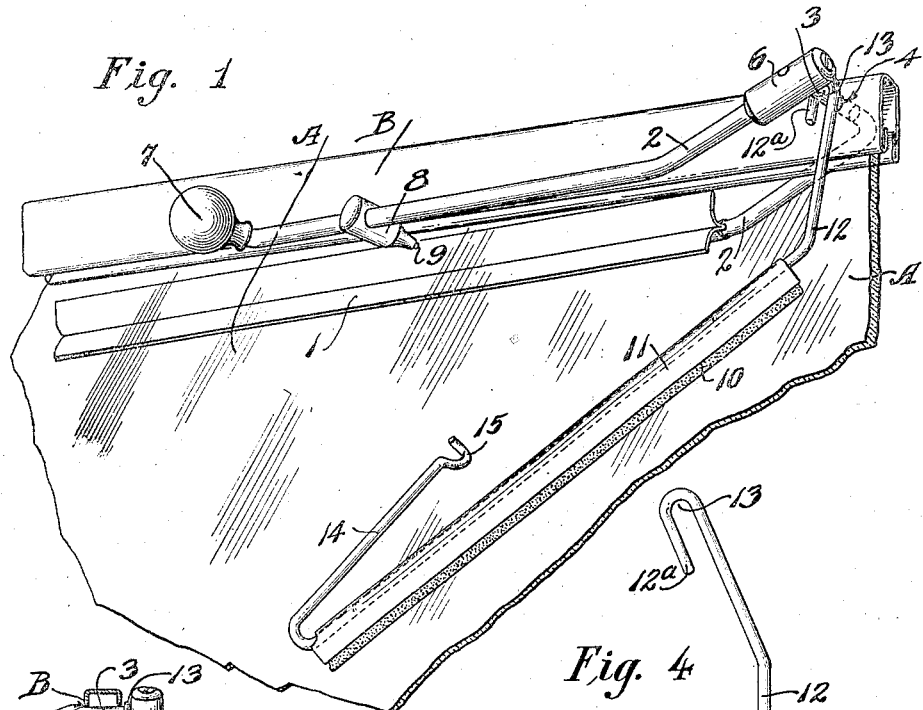
Fig. 1
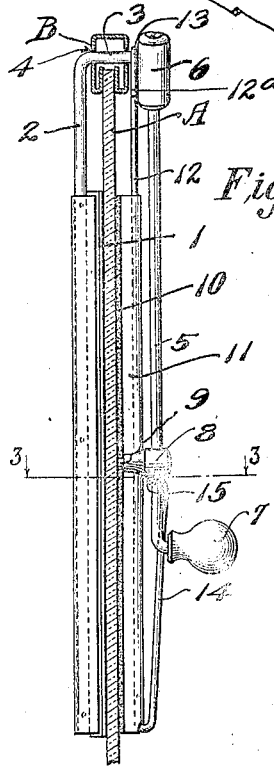
Fig. 2
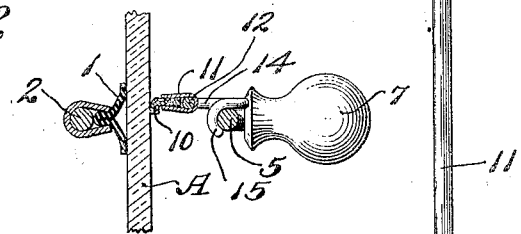
Fig. 3
Fig. 4
Inventor
S. C. Wolfe
By
Attorneys Patented Apr. 8, 1924.

1,489,294

UNITED STATES PATENT OFFICE.

SAMUEL C. WOLFE, OF ANGOLA, INDIANA, ASSIGNOR TO FERNALD MANUFACTURING COMPANY, OF NORTH EAST, PENNSYLVANIA, A CORPORATION.

WINDSHIELD CLEARER.

Application filed May 2, 1922. Serial No. 557,815.

*To all whom it may concern:*

Be it known that I, SAMUEL C. WOLFE, a citizen of the United States, residing at Angola, in the county of Steuben and State of Indiana, have invented certain new and useful Improvements in Windshield Clearers, of which the following is a specification.

The present invention relates to certain new and useful improvements in the construction of those devices which are commonly known in the motor vehicle art as windshield clearers, these being devices for removing accumulations of moisture, snow or ice from certain areas or zones of the windshield glass, so that the driver of the vehicle can obtain a clear vision of the road ahead and direct his car in such a manner as to avoid possible accidents.

Practically all of the windshield cleaners operate upon the outer face of the windshield glass, although there are conditions when it is desirable to wipe or clean the inner face of the glass, this being especially true with enclosed cars when there has been an opportunity for moisture to accumulate on the inside of the car. With this thought in mind the object of the present invention has been to provide an inside wiper, which embodies novel features of construction whereby it can be used either in conjunction with an outside wiper or independently of an outside wiper, and which provides an effective means for wiping or removing moisture condensations or accumulations from the inner face of the windshield glass. When the inside wiper is applied as an attachment to any of the conventional forms of outside wipers, it is susceptible of being operated independently of the outside wiper and can be quickly placed in operative position or removed therefrom.

For the purpose of illustration I have shown a particular embodiment of the inside wiper which is especially adapted to be used as an attachment in connection with an outside wiper, of that type disclosed in my co-pending application, Serial Number 522,485, which was filed on December 15, 1921, and it will be understood that I do not wish to restrict myself to the particular construction which is shown, but that many modifications and changes can be made in the details of construction without departing from the spirit of the invention.

For a full understanding of the invention reference is to be had to the following description and accompanying drawings, in which:

Figure 1 is a perspective view of one of the inside wipers which is mounted upon an outside wiper of the type disclosed in my above identified co-pending application, a fragmentary portion of the wind shield upon which the wipers are mounted being illustrated.

Figure 2 is a sectional view through a portion of a wind shield showing the two wipers or cleaners mounted thereon, the inside wiper being applied to the outside wiper so as to be operated in conjunction therewith.

Figure 3 is an enlarged transverse sectional view taken on the line 3—3 of Figure 2.

Figure 4 is a detached view of the inside wiper.

Corresponding and like parts are referred to in the following description and indicated on all of the views of the drawing by like reference characters.

Referring more specifically to the drawings, the reference character A designates a fragmentary portion of a wind shield glass, and B a section of the frame which ordinarily extends around and engages edge portions of the glass. The outside wiper or cleaner which has been shown for illustrative purposes does not constitute any part of the present invention, but is fully disclosed and claimed in my co-pending application which has been heretofore identified. For the purposes of the present application it may be very briefly explained that the outside wiping element 1 is carried by a cleaner arm 2, which has one end thereof suitably bent to provide a shaft 3 which is adapted to pass loosely through an opening 4 in the frame B or glass A, or to be fitted in a suitable notch in an edge portion of the wind shield. The handle arm 5 is arranged upon the inside of the wind shield in a spaced and substantially parallel relation to the cleaner arm 5, being provided at one end with a head 6 which is rigidly applied to the shaft 3, the opposite end of the handle arm terminating in a finger piece 7. A socket 8 is fitted upon the handle arm 3 at a point substantially opposite the middle of the wiping element 1, and said socket carries a contact member 9 of leather or other suitable material, which is adapted to bear resiliently against the inner face of the wind shield glass and to engage the glass without danger of scratching the same. The wiping element and the handle are thus in effect connected by a resilient arch and the inherent resiliency of this arch tends to retain the wiping element in an effective engagement with the outer face of the wind shield glass throughout the entire length of the said wiping element. It will be obvious that by swinging the handle arm 5 on the inside of the wind shield the wiping arm 1 will be swung across the outer face of the wind shield glass, with the result that any accumulations of moisture, snow or ice in the path of the wiping element will be removed from the glass so that the driver of the vehicle can obtain a clear vision through that portion of the wind shield glass which has been wiped. It may be mentioned that the shaft 3 is susceptible of moving longitudinally through the bearing opening or notch in the wind shield, so that the operator can, when desirable, exert a pull upon the finger piece 7 at the same time that the handle arm 5 is moved, and thereby draw the outside wiping element 1 into a closer or firmer contact with the glass.

In certain climates and under certain conditions which are encountered frequently in the operation of an enclosed car when there has been an opportunity for moisture to accumulate within the car, an inside wiper or cleaner is very desirable, in order that the vision of the driver of the vehicle may not be rendered indistinct or obscure by the condensation of moisture on the inner face of the wind shield glass. Under such conditions it is frequently necessary to clear the inside of the wind shield glass at times when the outside of the glass is perfectly clear, and it is then an advantage to be able to operate the inside wiper independently of the outside wiper, since the repeated operation of an outside wiper over a dry glass will ultimately result in scratching the glass.

The inside wiper which I have elected to illustrate for the purpose of explaining the invention includes a wiping strip 10 of any suitable material such as felt, rubber or the like, which is clamped between edge portions of a backing strip 11 which is transversely doubled. The looped portion of this doubled backing strip 11 receives and engages an inside cleaner arm 12, which has one end thereof deflected laterally at 12$^a$ and is provided with a lateral hook 13, while the opposite end thereof is returned upwardly to provide a resilient attachment arm 14 having a hook 15 at the extremity thereof.

In applying the inside wiper as an attachment to the outside wiper, the lateral hook 13 is first brought into engagement with the shaft 3 of the outside wiper, after which the inside wiper is swung against the socket 8 and the resilient arm 14 flexed inwardly until the hook 15 can be brought into engagement with the handle arm 5 of the outside cleaner. The hook 15 is arranged back of the strip 11 of the inside wiper at a point toward the middle portion thereof, so that the resiliency of the arm 14 will tend to hold the inside wiper in engagement with the surface of the glass throughout the entire length of the wiper. The hook 15 engages the handle arm 5 at a point adjacent the socket 8 so that when the attachment is in operative position, as indicated by Figure 2. it is impossible to move the inside wiper longitudinally a sufficient amount to disengage the hook 13 from the shaft 3 without first disengaging the hook 15 from the handle arm 5. When the inside wiper is applied to the outside clearer in this manner, it has an opposed relation to the outside wiping element 1 and a manipulation of the device through the medium of the finger piece 7 results in a simultaneous movement of the two wiping elements over corresponding areas on the outside and the inside of the wind shield glass, thereby removing any accumulations of moisture or the like from both the outside and the inside of the glass and enabling the driver to obtain a clear vision of the road ahead through the area of the glass which has thus been cleared.

If the outside face of the glass is dry and free from accumulations of moisture, the inside wiper can be manipulated independently of the outside wiper. For this purpose the hook 15 of the resilient arm 14 is disengaged from the handle arm 5 of the outside wiper, whereupon the rearwardly returned arm 14 of the inside wiper can be used as a finger piece for swinging the inside wiper across the inner face of the glass, the hook member 13 remaining in engagement with the shaft 3 which serves as a pivot center about which the inside wiper is swung. This enables moisture condensations or accumulations to be removed from the inner surface of the wind shield glass without danger of scratching the outer face of the wind shield glass by moving the outside wiper unnecessarily across the same when it is dry and free from moisture.

The inside wiper is also adapted to be used independently of any other wiper. The hook 13 thereof can be engaged with any conventional form of headed bolt or screw which is conveniently mounted upon the wind shield, and the arm 14 utilized as a finger piece for swinging the inside wiper back and forth against the said screw or bolt as a pivot center. The inside wiper is thus susceptible of a wide range of use, and it will be obvious that with slight modifications it can be readily adapted for use as an attachment with any of the conventional forms of outside clearers which are now in use. It is very simple in its construction and it can be readily placed in position or removed therefrom without the use of any tool.

Having thus described my invention what I claim as new and desire to secure by Letters Patent is,

1. In a windshield clearer the combination with a pivot member permanently applied to the windshield, of a wiper element provided at one end thereof with a hook member which has a quickly detachable engagement with the pivot member and serves both to secure the wiper element in position and provide a pivotal mounting on the pivot member, and a handle on the wiper element for holding the wiper element in engagement with the glass and swinging it about the pivot member as a center.

2. A wiper attachment for windshield cleaners of the type having a wiper mounted for reciprocation over the outer surface of the windshield glass and an operating arm for the wiper located adjacent the inner surface of the glass, said attachment comprising a wiper element, and resilient fastening means for detachably connecting said wiper element to the operating arm for holding the said wiper element in fixed relation to the operating arm and in yielding engagement with the inner surface of the windshield glass.

3. An auxiliary wiper attachment for windshield cleaners of that type having a wiper mounted for reciprocation over the surface of the windshield glass, said attachment including an auxiliary wiper element, and means for connecting the wiper element to the cleaner so that it can either be moved with the cleaner or swung about a part of the cleaner as a center while in operative engagement with the windshield glass, so as to clean the glass independently of any action of the main windshield cleaner itself.

4. A wiper attachment for windshield cleaners of the type having a shaft and handle arm and a wiper applied to the shaft for reciprocation over the windshield glass, said attachment including a wiper strip provided at one end with means for engaging the shaft and at the other end with means for engaging the handle arm.

5. A wiper attachment for windshield cleaners of that type which embody a shaft and handle arm and a wiper attached to the shaft for reciprocation over the windshield glass, said attachment including a wiper element provided at one end with means for detachably engaging the shaft and at the other end with resilient means for engaging the handle arm, whereby the wiper element is held in a resilient engagement with the windshield glass.

6. A wiper attachment for windshield cleaners of that type which embody a shaft and handle arm and a wiper applied to the shaft for reciprocation over the surface of the windshield glass, said attachment including a wiper element, an arm projecting from one end of the wiper element and provided with means for engaging the shaft, a resilient arm at the opposite end of the wiper element, said arm being bent and extended along a portion of the wiper element, and means upon the resilient arm for engaging the handle arm, the resiliency of the arm serving both to retain the arm in engagement with the handle arm and to hold the wiper element in engagement with the windshield glass.

7. A wiper attachment for windshield cleaners of that type which embody a shaft and handle arm and a wiper applied to the shaft for reciprocation over the windshield glass, said attachment including a wiper element, an arm carrying the wiper element and having one end thereof provided with a hooked extension which is adapted to engage the shaft, the other end of the arm being returned and terminating in a hook adapted to detachably engage the handle arm, and the returned portion being resilient and serving both to retain the hook member in engagement with the handle arm and to hold the wiper element in engagement with the glass.

8. A wiper attachment for windshield cleaners of that type which embody a shaft and handle arm and a wiper applied to the shaft for reciprocation over the surface of the windshield glass, the handle arm having an abutment thereon, said attachment including a wiper element, a hooked arm at one end of the wiper element adapted to engage the shaft, and a hook member carried by the opposite end of the wiper element and adapted to engage the handle arm and to cooperate with the abutment thereon to prevent the first mentioned hooked arm from becoming disengaged from the shaft.

9. A wiper attachment for windshield cleaners of that type which embody a shaft and handle arm and a wiper applied to the shaft for reciprocation over the surface of the windshield glass, said attachment including a wiper element, a hooked arm at one end of the wiper element for detachably engaging the shaft, and means at the opposite end of the wiper element for detachably engaging the handle arm and preventing disengagement of the hooked arm from the shaft.

10. A wiper attachment for windshield cleaners of that type having a wiper mounted for reciprocation over the surface of the windshield glass, said attachment including a wiper element, a fastening member at one end of the wiper element for detachably engaging the cleaner and a cooperating fastening means at the other end of the wiper element also detachably engaging the cleaner and cooperating with a part thereof to prevent disengagement of the first mentioned fastening means.

11. A wiper attachment for windshield cleaners of the type having a wiper mounted for reciprocation over the surface of the windshield glass clearers, said attachment including a wiper element, means for pivotally connecting one end of the wiper element with the cleaner, and means for detachably connecting the other end of the wiper element with the cleaner, whereby the wiper element can either be moved with the cleaner or the swinging end detached from the clearer and the wiper moved independent thereof.

In testimony whereof I affix my signature.

SAMUEL C. WOLFE.